US012537611B2

(12) United States Patent
Li et al.

(10) Patent No.: US 12,537,611 B2
(45) Date of Patent: Jan. 27, 2026

(54) METHODS AND EQUIPMENTS FOR LOCKING TRANSMISSION STATE

(71) Applicant: Samsung Electronics Co., Ltd., Suwon-si (KR)

(72) Inventors: Bozhi Li, Beijing (CN); He Wang, Beijing (CN); Xutao Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 18/015,848

(22) PCT Filed: Aug. 3, 2021

(86) PCT No.: PCT/KR2021/010148
§ 371 (c)(1),
(2) Date: Jan. 12, 2023

(87) PCT Pub. No.: WO2022/030950
PCT Pub. Date: Feb. 10, 2022

(65) Prior Publication Data
US 2023/0261766 A1 Aug. 17, 2023

(30) Foreign Application Priority Data
Aug. 6, 2020 (CN) .......................... 202010785094.3

(51) Int. Cl.
H04W 72/04 (2023.01)
H04B 17/10 (2015.01)
(Continued)

(52) U.S. Cl.
CPC ........... *H04B 17/15* (2015.01); *H04B 17/102* (2015.01); *H04W 52/367* (2013.01)

(58) Field of Classification Search
CPC ...... H04B 17/15; H04B 17/102; H04B 7/063; H04B 7/0689; H04B 1/38; H04B 7/0617;
(Continued)

(56) References Cited

U.S. PATENT DOCUMENTS 10,050,681 B2 8/2018 Kim et al.
2016/0007292 A1* 1/2016 Weng ................ H04W 52/0235
370/311

(Continued)

FOREIGN PATENT DOCUMENTS

KR 10-2016-0147499 A 12/2016
WO 2019/096802 A1 5/2019

OTHER PUBLICATIONS

Ericsson-3GPP R4-1709353, "Verification of UE transmissions characteristics for mmW", Sep. 11, 2017 (Year: 2017).*

(Continued)

*Primary Examiner* — Lan-Huong Truong
(74) *Attorney, Agent, or Firm* — Jefferson IP Law, LLP

(57) ABSTRACT

The present invention relates to a method executed by a user equipment for locking the transmission state of the equipment, comprises: receiving a downlink control signal for activating the transmission state locking of the user equipment; completing the corresponding transmission state locking after receiving the downlink control signal, and transmitting an uplink signal to feedback the result of the locking completion, wherein the down-link control signal for activating the transmission state locking of the user equipment includes a transmission state locking mode and parameters.

14 Claims, 4 Drawing Sheets

(51) Int. Cl.
H04B 17/15 (2015.01)
H04W 52/36 (2009.01)

(58) Field of Classification Search
CPC ... H04B 7/0667; H04W 52/367; H04W 52/42
See application file for complete search history.

(56) References Cited

U.S. PATENT DOCUMENTS

| | | | |
|---|---|---|---|
| 2016/0337011 A1 | 11/2016 | Ying et al. | |
| 2017/0155439 A1* | 6/2017 | Chang | H01Q 3/26 |
| 2020/0280377 A1* | 9/2020 | Haustein | H04B 17/104 |

OTHER PUBLICATIONS

Gui et al.; Stabilizing Transmission Capacity in Millimeter Wave Links by Q-Learning-Based Scheme; Hindawi; Mobile Information Systems; vol. 2020, Article ID 7607316, 17 pages; https://doi.org/10.1155/2020/7607316; Feb. 11, 2020.
Dong et al.; Adaptive antenna selection and Tx/Rx beamforming for large-scale MIMO systems in 60 GHz channels; Dong et al. EURASIP Journal on Wireless Communications and Networking 2011, 2011:59; http://jwcn.eurasipjournals.com/content/2011/1/59; Springer, 2011.
Giordani et al.; A Tutorial on Beam Management for 3GPP NR at mmWave Frequencies; IEEE; arXiv:1804.01908v2 [cs.NI] Nov. 4, 2019; Nov. 4, 2019.
International Search Report dated Oct. 29, 2021; International Appln. No. PCT/KR2021/010148.
Intel Corporation; NR Test Methods SI ad-hoc meeting notes; 3GPP TSG-RAN WG4 Meeting #87; R4-1808400; Busan, Korea; May 21-25, 2018; May 31, 2018.
Extended European Search Report dated Nov. 22, 2023; European Appln. No. 21853011.1-1206 / 4173148 PCT/KR2021010148.
European Office Action dated Jun. 24, 2025, issued in a European Patent Application No. 21 853 011.1.

* cited by examiner

[Fig. 1]
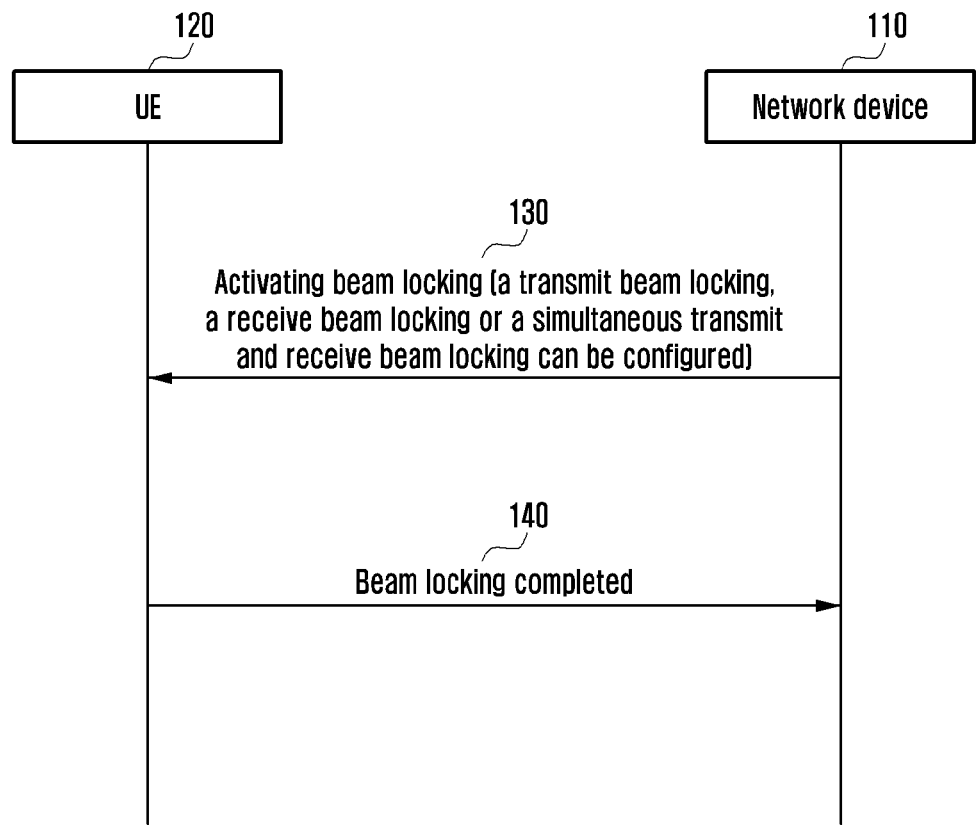

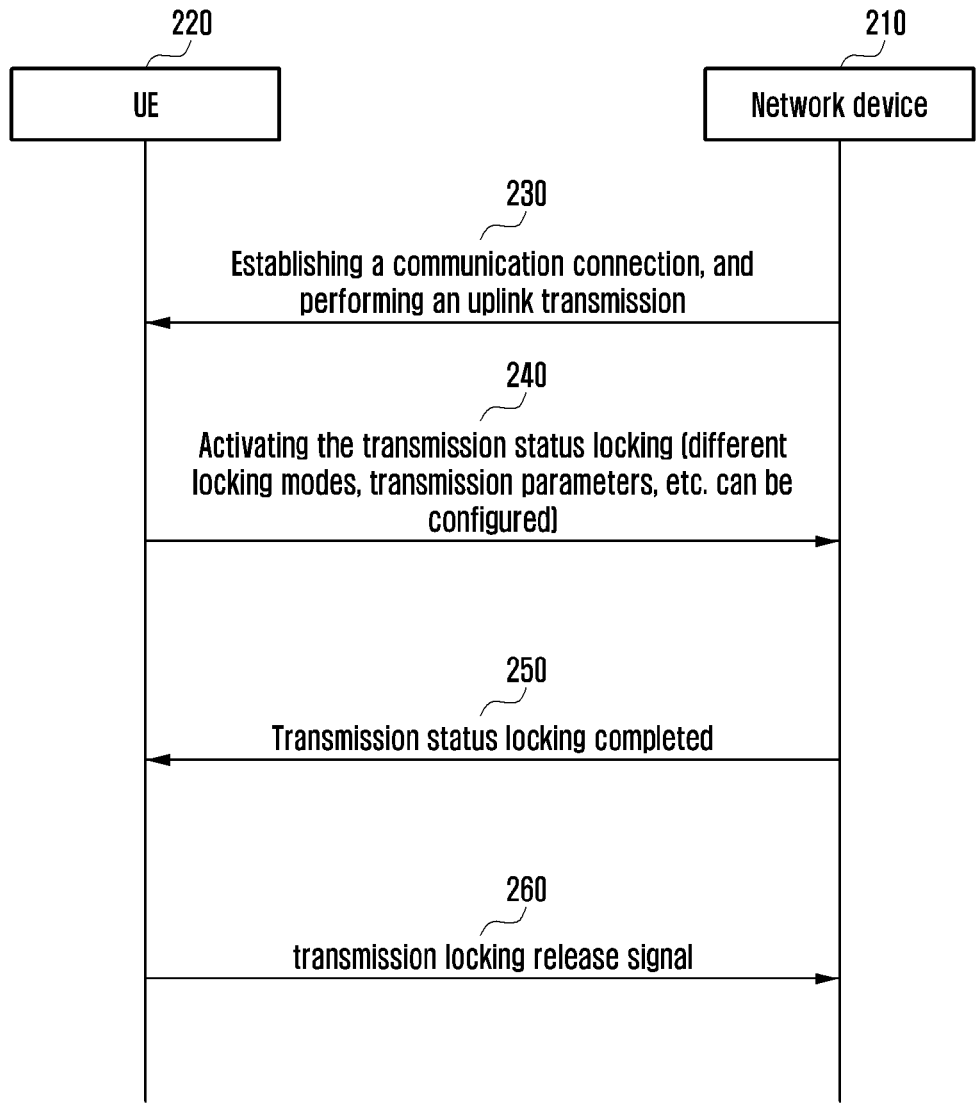

[Fig. 4]
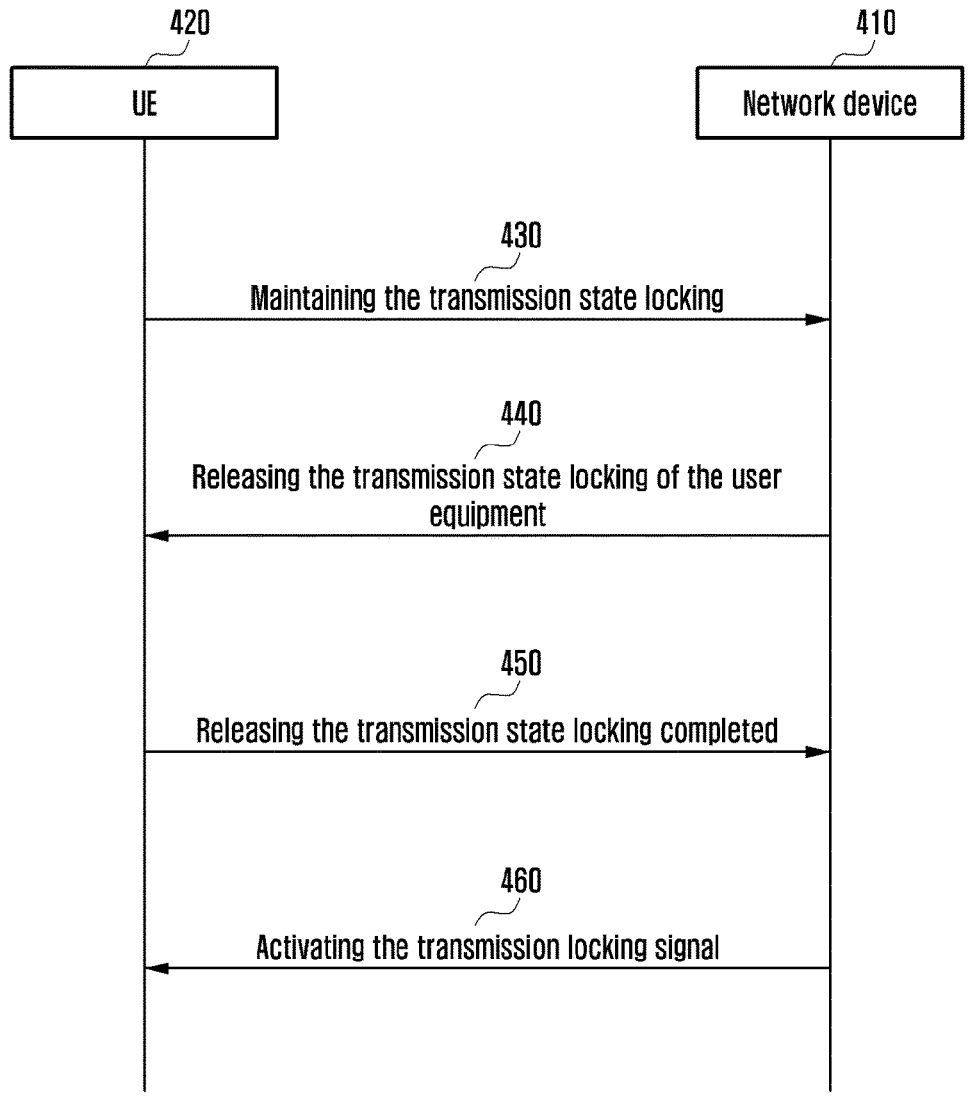
[Fig. 5]
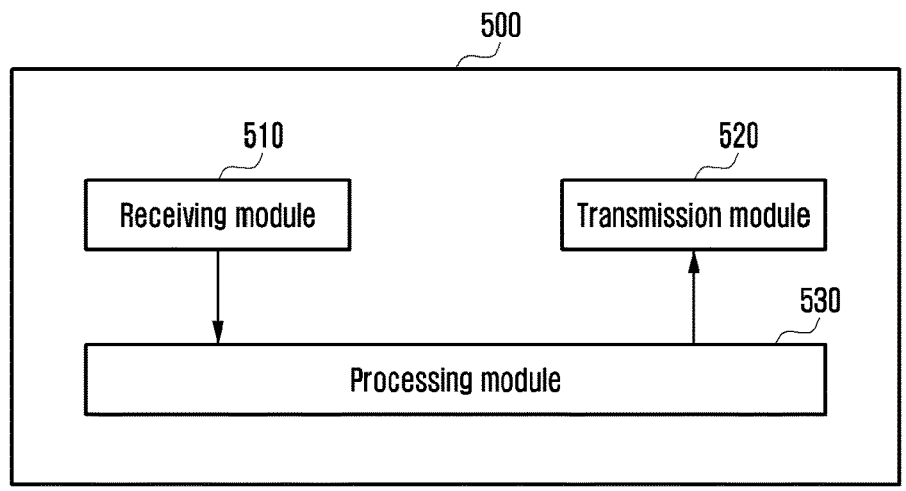

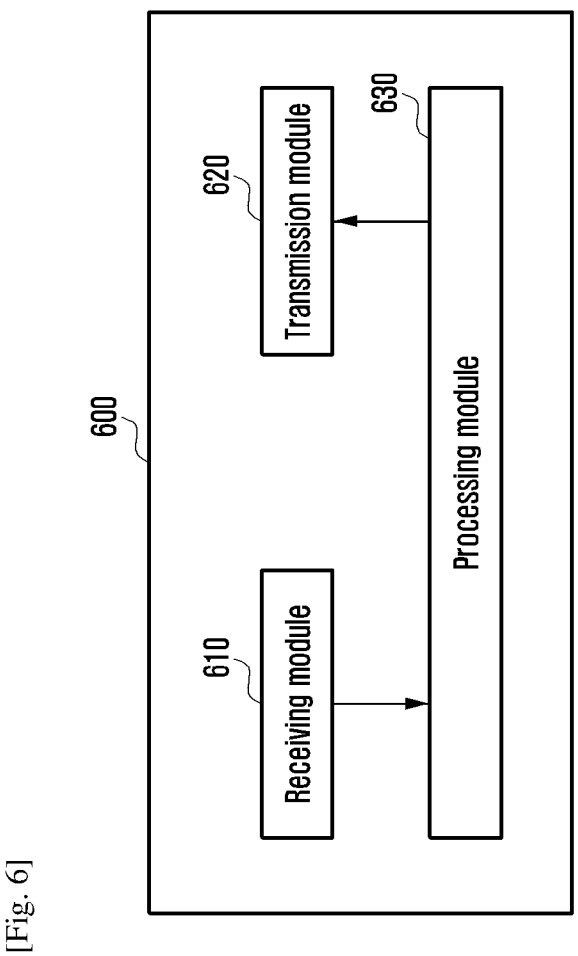
[Fig. 6]

METHODS AND EQUIPMENTS FOR LOCKING TRANSMISSION STATE

TECHNICAL FIELD

The invention relates to the technical field of wireless communication, in particular to a method and device for locking a transmission state.

BACKGROUND ART

The fifth generation mobile communication system (5G) adopts a new air interface (NR), and the support for multiple antennas is one of its important characteristics. In millimeter wave band, one antenna module is formed by an array of multiple antennas, and one user equipment can also have multiple antenna modules. In the frequency band below 6 GHz, it can also support up to 4 antennas, and has the multi-antenna transmission capability through the transmission diversity function.

In millimeter wave band, multiple antenna arrays can form dynamic beams, and dynamic beam tracking and scanning means that the antenna radiation pattern of user equipment will change with time. In addition, the switching of multiple antenna modules will aggravate the problem of time-varying transmission state. Time-varying transmission state can adapt to the change of real environment in a better way, but it will also bring unstable factors to the test of RF performance and antenna performance. Therefore, in the millimeter wave user equipment test, the user equipment beam locking function (UBF) is introduced to ensure the stability of the test beam. However, in the transmission diversity state, the transmission diversity mode and parameters are still variable, and the beam locking function can only lock beams, but cannot lock other transmit parameters (such as transmission diversity mode, transmit antenna selection and switching, transmit power allocation, delay parameters, etc.), so there is still a change in transmit state.

In addition, in the frequency band below 6 GHz, the user equipment does not have the beamforming function, so there is no beam locking problem. However, when transmitting with multiple antennas in the transmission diversity state, its transmission state will also change with time.

Therefore, regardless of millimeter wave or frequency band below 6 GHz, the current technology cannot fully solve the problem that the transmission state of user equipment changes with time in the transmission diversity state, and new technology is needed to ensure the stability of the transmission state of user equipment, so as to meet the needs of specific scenarios, such as test scenarios.

DISCLOSURE OF INVENTION

Technical Problem

The purpose of the present invention is to solve at least one of the above technical defects, and to propose a technical scheme for locking a transmission state of the equipment. According to the invention, the user equipment is provided with an engineering mode or a test mode with stable state through related signaling processes. Under the configuration of network device, the user equipment can lock the transmission state accordingly, ensure the stability of transmission mode and transmission parameters, and keep the transmission characteristics of the user equipment stable, thus stabilizing the transmission performance of the user equipment in specific scenarios. For example, when the radio frequency performance and antenna performance is tested, the transmission characteristics of the user equipment are stabilized. Especially when the user equipment supports multi-antenna transmission, for example, when the user equipment supports transmission diversity, the invention can ensure the stable state of the transmission performance of the user equipment.

Solution to Problem

According to one aspect of the present invention, there is provided a method executed by a user equipment for locking the transmission state of the equipment, which comprises: receiving a downlink control signal for activating the transmission state locking of the user equipment; completing the corresponding transmission state locking after receiving the downlink control signal, and then transmitting an uplink signal to feedback the result of the locking completion.

According to another aspect of the present invention, there is provided a method executed by the user equipment for locking the transmission state of the equipment, further comprising: before receiving the downlink control signal for activating the transmission state locking of user equipment, performing uplink transmission by the user equipment after establishing communication connection with network device.

According to another aspect of the present invention, there is provided a method executed by the user equipment for locking the transmission state of the equipment, further comprising: maintaining the transmission locking state by the user equipment to continue transmitting until the communication connection is disconnected or the locking is released according to a transmission locking release signal.

According to another aspect of the present invention, there is provided a method executed by the user equipment for locking the transmission state of the equipment, wherein the downlink control signal for activating the transmission state locking of the user equipment is received according to a scenario.

According to another aspect of the present invention, there is provided a method executed by the user equipment for locking the transmission state of the equipment, wherein the downlink control signal for activating the transmission state locking of the user equipment includes a transmission state locking mode and parameters.

According to another aspect of the present invention, there is provided a method executed by the user equipment for locking the transmission state of the equipment, wherein the transmission state locking modes include a default locking mode, a single antenna locking mode and a multi-antenna locking mode.

According to another aspect of the present invention, there is provided a method executed by the user equipment for locking the transmission state of the equipment, wherein the parameters include transmission diversity mode parameters, transmission antenna selection parameters, transmission diversity power allocation ratio parameters and transmission diversity delay parameters corresponding to the transmission state locking mode.

According to another aspect of the present invention, there is provided a method executed by the user equipment for locking the transmission state of the equipment, wherein the default locking mode is configured to lock the current transmission state and parameters of the user equipment.

According to another aspect of the present invention, there is provided a method executed by the user equipment for locking the transmission state of the equipment, wherein the scenario includes: a conduction maximum output power test, a conduction maximum output power back-off MPR test, a total radiation power TRP test and an equivalent isotropic radiated power EIRP test during transmission of dual antenna ports, and a millimeter wave transmission modulation quality test.

According to another aspect of the present invention, there is provided a method executed by the user equipment for locking the transmission state of the equipment, wherein the user equipment continuously transmits the maximum power according to the configured locking state in the conduction maximum output power test.

According to another aspect of the present invention, there is provided a method executed by the user equipment for locking the transmission state of equipment, wherein in the maximum output power back-off test, when the user equipment transmits the maximum power under the condition of allowing power back-off, the transmission power is within the index requirement specified by the maximum output power back-off MPR.

According to another aspect of the present invention, there is provided a method executed by the user equipment for locking the transmission state of the equipment, wherein the radiation pattern characteristics of the user equipment are locked in the total radiation power TRP test and the equivalent isotropic radiated power EIRP test during transmission of the dual antenna ports, so as to perform antenna performance OTA measurement.

According to another aspect of the present invention, there is provided a method executed by the user equipment for locking the transmission state of the equipment, wherein in the millimeter wave transmission modulation quality test, transmission diversity is turned off when a single antenna transmission locking mode is configured; and the radiation power and transmission diversity delay parameters of each antenna port are locked when the multi-antenna transmission locking mode is configured.

According to another aspect of the present invention, there is provided a method executed by the user equipment for locking the transmission state of the equipment, wherein the corresponding transmission state locking mode and parameters are configured according to the detection result of the current uplink signal transmitted by the user equipment.

According to another aspect of the present invention, there is provided a method executed by the user equipment for locking the transmission state of the equipment, wherein releasing the locking according to a transmission locking release signal comprises: receiving a downlink control signal for releasing the transmission state locking of the user equipment; releasing the transmission state locking by the user equipment after receiving the downlink control signal for releasing the transmission state locking of the user equipment, and then transmitting an uplink signal to feedback the completion result of releasing the locking; and maintaining the unlocking state by the user equipment until the communication connection is disconnected or a signal for activating transmission locking is received.

According to another aspect of the present invention, there is provided a method executed by a network device for locking the transmission state of the equipment, comprising: transmitting a downlink control signal for activating the transmission state locking of the user equipment; receiving an uplink signal indicating a result to feedback locking completion.

According to another aspect of the present invention, there is provided a method executed by the network device for locking the transmission state of the equipment, further comprising: transmitting a downlink control signal for releasing the transmission state locking of the user equipment, and receiving an uplink signal to feedback the result of releasing the locking completion.

According to another aspect of the present invention, there is provided a user equipment for performing transmission state locking, which comprises: a receiving module configured to receive a downlink control signal for activating transmission state locking of the user equipment; a processing module configured to complete the configuration of activating transmission state locking according to the downlink control signal received by the receiving module, and a transmission module configured to convert the baseband signal transmitted from the processing module into a radio frequency signal and transmit it through a transmission antenna port.

According to another aspect of the present invention, there is provided a network device for performing transmission state locking, which comprises: a receiving module configured to receive a signal transmitted uplink from a user equipment; a processing module configured to configure a downlink control signal for activating the transmission state locking of the user equipment according to the detection result of the signal transmitted uplink from the user equipment, and a transmission module configured to transmit the downlink control signal for activating the transmission state locking of the user equipment.

According to another aspect of the present invention, there is provided an electronic device including: a memory configured to store a computer program; and a processor configured to run the computer program to implement any one of the method described above.

Advantageous Effects of Invention

According to the complete scheme for the transmission state locking of the user equipment provided by the present invention, the user equipment has a stable engineering mode or test mode through the related signaling process. Especially for the user equipment supporting multiple antennas, this scheme can ensure the stability of the transmission mode and transmission parameters of the user equipment, and can provide the required stable and reliable transmission state for some special scenarios, such as test scenarios.

BRIEF DESCRIPTION OF DRAWINGS

For a more complete understanding of the present disclosure and its advantages, reference is now made to the following description in conjunction with the accompanying drawings, in which like reference numerals refer to like parts:

FIG. 1 is a schematic diagram of beam locking of millimeter wave user equipment in the prior art;

FIG. 2 is a schematic diagram of transmission state locking according to an embodiment of the present invention;

FIG. 3 is a schematic diagram of signaling message format for activating transmission state locking according to an embodiment of the present invention;

FIG. 4 is a schematic diagram showing the releasing of the locking for the user equipment while the communication connection is maintained according to the embodiment of the present invention;

FIG. 5 is a schematic diagram showing the structure of user equipment according to an embodiment of the present invention; and FIG. 6 is a schematic diagram showing the structure of a network device according to an embodiment of the present invention.

MODE FOR THE INVENTION

It may be advantageous to elaborate the definitions of certain words and phrases used throughout this patent document prior to the following detailed description. The term "coupling" and its derivatives refer to any direct or indirect communication between two or more elements, whether or not those elements are in physical contact with each other. The terms "transmit", "receive" and "communicate" and their derivatives cover both direct and indirect communications. The terms "including" and "including" and their derivatives mean including, but not limited to. The term "or" is inclusive, meaning and/or. The phrase "and "Associated" and its derivatives refer to include, include in Inside, interconnected, contained, contained in To connect with or with To connect, couple, or connect with To couple with To communicate, cooperate, interweave, juxtapose, approach, bind, or associate with To bind, have, have an attribute, have a relationship, or be associated with It's related, etc. The term "controller" refers to any device, system or part thereof that controls at least one operation. Such a controller may be implemented in hardware, or a combination of hardware and software and/or firmware. The functions associated with any particular controller can be centralized or distributed, whether local or remote. The phrase "at least one", when used with a list of items, means that different combinations of one or more of the items listed can be used and that only one item in the list may be needed. For example, "at least one of a, B, C" includes any of the following combinations: A, B, C, a and B, a and C, B and C, a and B and C.

Definitions of other specific words and phrases are provided throughout this patent document. It should be understood by those of ordinary skill in the art that in many cases, if not in most cases, such a definition applies to the previous and future use of words and phrases so defined.

The above-mentioned application combination of transform blocks and division level of sub-transform blocks are only for illustration, and the application combination of transform blocks and division level of sub-transform blocks can have different ways without departing from the scope of this disclosure.

FIG. 1 is a schematic diagram of the prior art, and this technical scheme is only applicable to beam locking in millimeter wave band. In FIG. 1, block 110 is shown as a network device and block 120 is shown as a user device. At step 130, the network device 110 sends a signaling to activate beam locking, and according to different signaling contents, it can activate a transmit beam locking, a receive beam locking or a simultaneous transmit and receive beam locking, respectively. At step 140, the user equipment 120 feeds back the signaling of beam locking completion to the network device 110 after completing the beam locking according to the signaling. As mentioned above, this technology is only applicable to the beam locking, and does not involve other multi-antenna related transmission modes and parameters. In addition, this technology is only applicable to user equipment with antenna array in millimeter wave frequency band, but not to user equipment in frequency band below 6 GHz.

Hereinafter, various embodiments of the present invention will be explained with reference to FIGS. 2 to 6. The various embodiments used to describe the principles of the disclosure in this patent document are merely exemplary and should not be interpreted as limiting the scope of the disclosure in any way.

According to one aspect of the present invention, according to the needs of the scenarios, the network device can send a signaling to activate the transmission state locking of the user equipment, thereby locking the current transmission state of the user equipment or lock the corresponding transmission state and transmission parameters according to the signaling content, wherein the transmission parameters include transmission diversity mode parameters, transmission antenna selection parameters, transmission diversity power allocation ratio parameters, transmission diversity delay parameters, etc., so as to ensure stable transmission of user equipment, especially user equipment that supports multiple antennas, and meet the requirements of special scenarios such as radio frequency test and antenna test. In addition, the network device can configure the corresponding transmission state locking mode according to the detection result of the uplink transmission signal of the current user equipment; the network device can adaptively configure different radio frequency index requirements according to different transmission state locking modes.

It should be understood that the technical scheme for the transmission state locking of user equipment proposed by the present invention is not only applicable to millimeter wave frequency bands, but also to frequency bands below 6 GHz, or other newly defined wireless communication frequency bands. In the test scenario, it is suitable for both conduction test and radiation test.

FIG. 2 is a schematic diagram of transmission state locking according to an embodiment of the present invention. The embodiment shown in FIG. 2 is for illustration only. Other divisions may be used without departing from the scope of the present disclosure.

Referring to FIG. 2, a method for the transmission state locking of user equipment is proposed according to an embodiment of the present invention. As shown in FIG. 2, block 210 is shown as a network device and block 220 is shown as a user equipment. In step 230, the user equipment performs uplink transmission after establishing communication connection with the network device. In step 240, the network device 210 sends a downlink control signal to activate transmission state locking, and different locking modes and transmission parameters can be configured according to different contents of the downlink control signal. In step 250, after the user equipment 220 completes the transmission state locking according to the downlink control signal, it feeds back the signaling of the completion of the transmission state lock to the network device 210. In step 260, the user equipment maintains the transmission locking state and continues to transmit until the communication connection is disconnected or the locking is stopped after receiving the release signal of the transmission locking.

According to an embodiment of the present invention, in step 230, the user equipment performs uplink transmission after establishing a communication connection with the network device, which is a conventional transmission performed by the user equipment according to the configuration and communication specifications of the network device, and the communication connection may include a voice call connection or a data communication connection.

According to an embodiment of the present invention, in step 240, the network device may decide the content of downlink control signal to activate the transmission state locking according to different scenarios, thereby configuring the user equipment 220 to enter different transmission state locking modes, wherein the locking modes may include a default locking mode, a single antenna locking mode, a multi-antenna locking mode, and the like. According to an embodiment of the present invention, each locking mode may also include one or more parameter configurations, wherein the parameter configurations include transmission diversity mode parameters, transmit antenna selection parameters, transmission diversity power allocation ratio parameters, transmission diversity delay parameters, and the like.

According to an embodiment of the present invention, the default locking mode can be configured as a locking mode for locking the current transmission state and parameters of the user equipment.

According to an embodiment of the present invention, the network device can configure different transmission locking modes and parameters according to the current scenario, such as different test cases.

According to an embodiment of the present invention, the transmission diversity power allocation ratio parameter can be configured to be evenly allocated, for example, when two antenna ports are used for transmission, the power allocation of each port is 50%.

According to one embodiment of the present invention, the transmission diversity delay parameter may be configured to be zero.

According to an embodiment of the present invention, the network device can configure the corresponding transmission state locking mode according to the detection result of the current uplink transmission signal of the user equipment.

According to an embodiment of the present invention, the network device can adaptively configure different radio frequency index requirements according to different transmission state locking modes.

The following is an exemplary description of step 240 based on several specific scenarios. Those skilled in the art should understand that the following scenario examples are only exemplary and should not be interpreted as limiting the scope of the present disclosure in any way.

Scenario 1: Conduction Maximum Output Power (MOP) Test

Conduction test is the main way of radio frequency conformance test for user equipment below 6 GHz. Each antenna port of user equipment needs to be connected with network device through radio frequency cable for testing, and the maximum output power (MOP) test is one of the most important test cases. When the user equipment supports multi-antenna port transmission, there is a problem that the radio frequency performance of each antenna port changes with time, thereby the MOP measurement cannot be performed stably. According to present technology, the user equipment transmits according to the maximum transmission power, and the network device can detect the transmission power of each antenna port of the user equipment. If the network device detects the transmission of a single antenna port, it can configure a single antenna transmission locking mode. If the network device detects multi-antenna port transmission, it can configure multi-antenna transmission locking mode. Furthermore, the default transmission locking mode can also be configured directly. Typically, in the multi-antenna transmission locking mode, the antenna ports used for transmission can be locked, and the transmission diversity power allocation ratio parameter between the transmission antenna ports can be configured to be evenly distributed, for example, when two antenna ports are used to transmit, the power allocation of each port is 50%. The transmission diversity delay parameter can be configured to be zero. After passing the above typical transmission locking mode and parameter configuration, the user equipment continuously transmits the maximum power according to the configured locking state, so that the performance of each antenna port is stable and the network device can measure the reliable maximum output power.

Scenario 2: Conduction Maximum Output Power Fall-Back (MPR) Test

When the user equipment uses different modulation methods/transmission bandwidths/waveforms, etc. to perform maximum power transmission, the transmission power will fall back to a certain extent. The purpose of the maximum output power fall-back (MPR) test is to test that the measured transmission power is within the index requirements specified by the MPR when the user equipment performs maximum power transmission under the condition of allowing power fall-back. Due to the different characteristics of multi-antenna ports, MPR index requirements can be different for single-antenna port or multi-antenna ports. According to present technology, when a conduction MPR test is performed on a user equipment, the network device can detect the transmission power of each antenna port of the user equipment. If the network device detects the transmission of a single antenna port, it can configure a single antenna transmission locking mode and set the radio frequency index requirements corresponding to the single antenna transmission. If the network device detects the multi-antenna port transmission, it can configure the multi-antenna transmission locking mode and set the radio frequency index requirements corresponding to the multi-antenna transmission. With the above method, when a conduction MPR test is performed on a user equipment, the network device can adaptively configure the transmission locking mode and adapt to the corresponding index requirements.

Scenario 3: Total Radiated Power (TRP) Test and Equivalent Omni-Directional Radiated Power (EIRP) Test During Transmission of Dual Antenna Ports When performing an air interface antenna performance (OTA) test on user equipment, different power amplitudes and phases between multiple transmission antenna ports will produce different radiation field superimposition effects in the far field. On the premise that the power amplitude and phase of each transmission antenna port cannot be kept stable, as the test progresses, the radiated power in different parts of the space will continue to change, and meaningful test results cannot be obtained. Typically, according to the present technology, when performing OTA testing during dual-antenna port transmission, such as total radiated power (TRP) test and equivalent isotropic radiated power (EIRP) test, the network device is configured with dual-antenna transmission locking mode, and the power of each port is allocated to 50% when two antenna ports are used for transmitting; the transmission diversity delay parameter is configured to zero. With the above method, when the network device tests the antenna performance of the user equipment, the radiation pattern characteristics of the user equipment can be locked, thereby meaningful OTA measurement can be made.

Scenario 4: Millimeter Wave Transmission Modulation Quality Test

When the millimeter wave radio frequency test is carried out currently, the network device can only be configured for single polarization receiving and demodulation. Especially, in the situation of testing the modulation quality of millimeter wave transmission, such as Error Vector Magnitude (EVM), when the user equipment supports transmission diversity, the single polarization receiving and demodulating of the network device will have great fluctuation on the measurement results. According to the present technology, in the situation of testing the transmission modulation quality of user equipment, the network device can not only configure the single antenna transmission locking mode, that is, turning off the transmission diversity, but also the multi-antenna transmission locking mode to lock the radiation power and transmission diversity delay parameters of each antenna port at the same time. With the above method, when the network device performs millimeter wave transmission modulation quality test on the user equipment, the problem of fluctuation in the test result can be effectively solved.

The scenarios given above are only exemplary examples of the implementation of step 240 in the present invention, and the specific implementation is not limited to these scenarios. In actual implementation, various combinations can be combined and/or weighted based on the idea of the embodiment of the present invention.

Through the simulation of the above scenario, those skilled in the art should understand that the present invention can not only lock the transmission state, but also flexibly configure the locking mode and parameters, so as to meet different practical requirements.

According to an embodiment of the present invention, in step 240, the downlink control signal for activating transmission state locking may contain different contents, which may contain various transmission state locking modes and parameters. This function can be realized by one binary message, as shown in FIG. 3. All or part of the 8 bits in the binary message can be used. The value of X1 to X8 is 0 or 1, and different binary data combinations can represent different transmission state locking modes and parameters.

According to an embodiment of the present invention, in step 250, after the user equipment 220 completes the corresponding transmission state locking according to the downlink control signal content in step 240, it feeds back the completion result to the network device.

According to an embodiment of the present invention, in step 260, the user equipment maintains the transmission locking state and continues to transmit until the communication connection is disconnected or the locking is stopped after receiving the release signal of the transmission locking.

FIG. 4 is a schematic diagram showing the releasing of the locking for the user equipment while the communication connection is maintained according to the embodiment of the present invention.

Referring to FIG. 4, the step of releasing the locking while maintaining the communication connection is the reverse process of activating locking, which includes the following steps:

At step 430, the user equipment maintains transmission state locking while maintaining communication connection with the network device.

At step 440, the network device sends a downlink control signal to release the transmission state locking of the user equipment, so as to configure the user equipment to release the transmission state locking.

At step 450, after receiving the signal sent by the network device, the user equipment releases the transmission state locking, and then sends an uplink signal to feedback the result of releasing the locking.

At step 460, the user equipment maintains the unlocked state until the communication connection is disconnected or a signal for activating transmission locking is received.

On the other hand, the embodiment of the invention also provides a user equipment for implementing the transmission state locking method provided by the invention. The user equipment in the embodiments of the present disclosure may include, but is not limited to, devices such as mobile phones, smart phones, notebook computers, PDAs (personal digital assistants), PADs (tablet computers), desktop computers, wearable devices, robots, drones, Internet of Things terminals, and the like.

FIG. 5 is a schematic diagram showing the structure of user equipment according to an embodiment of the present invention. As shown in FIG. 5, the user equipment 500 includes: a receiving module 510, a transmission module 520 and a processing module 530.

The receiving module 510 is configured to receive the downlink RF signal, convert it into baseband signal and transmit it to the processing module.

The transmission module 520 is used to convert the baseband signals transmitted by the processing module into radio frequency signals and transmit them through one or more transmission antenna ports.

The processing module 530 is used to measure, analyze, store, calculate, convert and control signals.

According to an embodiment of the present invention, the processing module 530 can parse the configuration signaling for activating or releasing the transmission state locking according to the information transmitted from the receiving module 510, and then adjust the baseband signal parameters accordingly and configure the transmission module accordingly.

On the other hand, the embodiment of the invention also provides a network device for implementing the transmission state locking provided by the invention. The network devices in the embodiments of the disclosure may include, but are not limited to, base stations, repeaters, integrated access and backhaul devices, hotspots, ad hoc network nodes, test instruments with system simulation functions, and the like.

FIG. 6 is a schematic diagram showing the structure of a network device according to an embodiment of the present invention. As shown in FIG. 6, the user equipment 600 includes a receiving module 610, a transmission module 620 and a processing module 630.

The receiving module 610 is configured to receive the uplink transmitted signal from the user equipment.

The processing module 630 is used to measure, analyze, store, calculate, convert and control signals. In one embodiment, the processing module 630 is configured to configure the corresponding transmission state locking mode and parameters according to the detection result of the uplink transmitted signal of the user equipment.

The transmission module 620 is configured to send a downlink control signal for activating transmission state locking of the user equipment, so as to configure the user equipment to perform transmission state locking.

According to the embodiment of the invention, a complete technical scheme for realizing transmission state locking of user equipment is provided. Through rich signaling content, the scheme realizes flexible and diverse transmission state locking, which not only locks the transmission state of user equipment to ensure the stability of the transmission state of user equipment, but also flexibly configures the locking state, meets the requirements of different scenarios and achieves the balance of stability and flexibility.

Those of ordinary skill in the technical field can understand that all or part of the steps carried by the method for implementing the above embodiments can be completed by instructing related hardware through a program, which can be stored in a computer readable storage medium, and the program includes one or a combination of the steps of the method embodiments when executed.

As those skilled in the art know, according to the structure, the above example structure can be implemented in various ways, such as program instructions executed by a processor, software modules, microcode, computer program products on a computer readable medium, analog/logic circuits, application specific integrated circuits, firmware, consumer electronic devices, AV devices, wireless/wired transmitters, wireless/wired receivers, networks, multimedia devices, and the like. Furthermore, embodiments of the structure may take the form of an entirely hardware embodiment, an entirely software embodiment, or an embodiment containing elements of both hardware and software.

One or more embodiments have been described with reference to flowcharts and/or block diagrams of methods, apparatuses (systems) and computer program products according to one or more embodiments. Each block or combination of such diagrams/charts may be implemented by computer program instructions. When provided to a processor, the computer program instructions generate a machine such that the instructions, which are executed via the processor, create means for implementing the functions/operations specified in the flowchart and/or block diagrams. Each block in the flowchart/block diagram may represent hardware and/or software modules or logic implementing one or more embodiments. In alternative embodiments, the functions marked in the boxes may occur simultaneously, out of the order marked in the figure, and so on.

The terms "computer program medium", "computer usable medium", "computer readable medium" and "computer program product" are generally used to refer to media such as main memory, auxiliary memory, removable storage drive, hard disk installed in hard disk drive, etc. These computer program products are means of providing software to computer systems. A computer-readable medium allows a computer system to read data, instructions, messages or message packets and other computer-readable information from the computer-readable medium. For example, the computer-readable medium may include nonvolatile memory such as floppy disks, ROM, flash memory, disk drive memory, CD-ROM and other permanent storage. For example, it can be used to transfer information, such as data and computer instructions, between computer systems. Computer program instructions may be stored in a computer-readable medium that may direct a computer, other programmable data processing apparatus, or other apparatus to operate in a particular manner, such that the instructions stored in the computer-readable medium produce an article of manufacture including instructions that implement the functions/acts specified in the flowchart and/or block diagram block or blocks.

Computer program instructions representing the block diagrams and/or flowcharts herein may be loaded onto a computer, a programmable data processing device, or a processing device, so that a series of operations performed thereon produce computer-implemented processes. A computer program (i.e., computer control logic) is stored in the main memory and/or the auxiliary memory. A computer program may also be received via a communication interface. Such computer programs, when executed, enable a computer system to perform the features of the embodiments discussed herein. In particular, the computer program, when executed, enables the processor and/or the multi-core processor to perform features of the computer system. This computer program represents the controller of a computer system. A computer program product includes a tangible storage medium readable by a computer system and stores instructions executed by the computer system for performing the method of one or more embodiments.

Although the present disclosure has been described with exemplary embodiments, various changes and modifications can be suggested to those skilled in the art. This disclosure is intended to cover such changes and modifications as fall within the scope of the appended claims.

Any description in the present invention should not be understood as implying that any particular element, step or function is an essential element that must be included within the scope of the claims. The scope of patent subject matter is limited only by the claims.

The invention claimed is:

1. A method executed by a user equipment for locking a transmission state of the user equipment, the method comprising:
performing uplink transmission by the user equipment after establishing communication connection with a network device;
receiving a downlink control signal for activating the transmission state locking of the user equipment; and
completing the corresponding transmission state locking after receiving the downlink control signal, and transmitting an uplink signal to feedback the result of the locking completion,
wherein the downlink control signal for activating the transmission state locking of the user equipment includes a transmission state locking mode and parameters.

2. The method according to claim 1, further comprising:
maintaining the transmission locking state by the user equipment to continue transmitting until the communication connection is disconnected or the locking is released according to a transmission locking release signal.

3. The method according to claim 2, wherein releasing the locking according to the transmission locking release signal comprises:
receiving a downlink control signal for releasing the transmission state locking of the user equipment;
releasing the transmission state locking by the user equipment after receiving the downlink control signal for releasing the transmission state locking of the user equipment, and then transmitting an uplink signal to feedback the completion result of releasing the locking; and
maintaining the unlocking state by the user equipment until the communication connection is disconnected or a signal for activating transmission locking is received.

4. The method according to claim 1, wherein the downlink control signal for activating the transmission state locking of the user equipment is received according to a scenario.

5. The method according to claim 4, wherein the scenario includes at least one of a conduction maximum output power test, a conduction maximum output power back-off (MPR) test, a total radiation power (TRP) test and an equivalent isotropic radiated power (EIRP) test during transmission of dual antenna ports, and a millimeter wave transmission modulation quality test.

6. The method according to claim 5, wherein the user equipment continuously transmits with the maximum power according to the configured locking state in the conduction maximum output power test.

7. The method according to claim 5, wherein in the maximum output power back-off test, when the user equipment transmits with the maximum power under the condition of allowing power back-off, the transmission power is within an index requirement specified by the maximum output power back-off MPR.

8. The method according to claim 5, wherein the radiation pattern characteristics of the user equipment are locked in the total radiation power TRP test and the equivalent isotropic radiated power EIRP test during transmission of the dual antenna ports, to perform an antenna performance over-the-air (OTA) measurement.

9. The method according to claim 5, wherein in the millimeter wave transmission modulation quality test, the transmission diversity is turned off when a single antenna transmission locking mode is configured; and the radiation power and transmission diversity delay parameters of each antenna port are locked when the multi-antenna transmission locking mode is configured.

10. The method according to claim 1, wherein the transmission state locking modes include a default locking mode, a single antenna locking mode and a multi-antenna locking mode.

11. The method according to claim 10, wherein the default locking mode is configured to lock the current transmission state and parameters of the user equipment.

12. The method according to claim 1, wherein the parameters include at least one of a transmission diversity mode parameter, a transmission antenna selection parameter, a transmission diversity power allocation ratio parameter and a transmission diversity delay parameter corresponding to the transmission state locking mode.

13. The method according to claim 1, wherein the corresponding transmission state locking mode and parameters are configured according to a detection result of the current uplink signal transmitted by the user equipment.

14. A method executed by a network device for locking a transmission state of a user equipment, the method comprising:
    performing uplink transmission by the user equipment after establishing communication connection with a network device;
    transmitting a downlink control signal for activating the transmission state locking of a user equipment; and
    receiving an uplink signal indicating a result to feedback locking completion,
    wherein the downlink control signal for activating the transmission state locking of the user equipment includes a transmission state locking mode and parameters.

* * * * *